US011909015B2

(12) United States Patent
Zhang et al.

(10) Patent No.: US 11,909,015 B2
(45) Date of Patent: Feb. 20, 2024

(54) BATTERY STATUS INDICATION METHOD, BATTERY STATUS INDICATION APPARATUS, AND MOBILE DEVICE

(71) Applicant: SZ DJI TECHNOLOGY CO., LTD., Shenzhen (CN)

(72) Inventors: Qirui Zhang, Shenzhen (CN); Qiu Lan, Shenzhen (CN); Yu Zhou, Shenzhen (CN)

(73) Assignee: SZ DJI TECHNOLOGY CO., LTD., Shenzhen (CN)

( * ) Notice: Subject to any disclaimer, the term of this patent is extended or adjusted under 35 U.S.C. 154(b) by 536 days.

(21) Appl. No.: 17/144,558

(22) Filed: Jan. 8, 2021

(65) Prior Publication Data
US 2021/0135303 A1 May 6, 2021

Related U.S. Application Data

(63) Continuation of application No. PCT/CN2018/096184, filed on Jul. 18, 2018.

(51) Int. Cl.
*H01M 10/48* (2006.01)
*G08B 5/36* (2006.01)
*H01M 10/615* (2014.01)
*H01M 10/625* (2014.01)
*H01M 10/052* (2010.01)

(52) U.S. Cl.
CPC ............ *H01M 10/488* (2013.01); *G08B 5/36* (2013.01); *H01M 10/052* (2013.01); *H01M 10/486* (2013.01); *H01M 10/615* (2015.04); *H01M 10/625* (2015.04); *H01M 2220/20* (2013.01)

(58) Field of Classification Search
CPC ............ H01M 10/488; H01M 10/052; H01M 10/486; H01M 10/615; H01M 10/625; H01M 2220/20; G08B 5/36
See application file for complete search history.

(56) References Cited

U.S. PATENT DOCUMENTS 10,352,777 B2 * 7/2019 Georgeson .......... H01M 10/488

FOREIGN PATENT DOCUMENTS

| CN | 102969758 A | 3/2013 |
| CN | 104852410 A | 8/2015 |
| CN | 205921049 U | 2/2017 |
| CN | 106688136 A | 5/2017 |
| CN | 206422189 U | 8/2017 |

(Continued)

OTHER PUBLICATIONS

The World Intellectual Property Organization (WIPO) International Search Report for PCT/CN2018/096184 dated Apr. 22, 2019 7 Pages (including translation).

*Primary Examiner* — John A Tweel, Jr.
(74) *Attorney, Agent, or Firm* — ANOVA LAW GROUP, PLLC (57) ABSTRACT

A battery status indication method, A battery status indication apparatus, and a mobile device are provided. The battery status indication method includes: obtaining a power level and a heat state of a battery, the heat state including an unheated state and a heating state; determining a display mode of indicator lights according to the power level and the heat state of the battery; and controlling the indicator lights to display according to the display mode to indicate the power level and the heat state of the battery.

20 Claims, 7 Drawing Sheets

(56) References Cited

FOREIGN PATENT DOCUMENTS

| CN | 206432351 U | 8/2017 |
| CN | 206558638 U | 10/2017 |
| CN | 206834248 U | 1/2018 |

* cited by examiner

BATTERY STATUS INDICATION METHOD, BATTERY STATUS INDICATION APPARATUS, AND MOBILE DEVICE

CROSS-REFERENCE TO RELATED APPLICATION

This application is a continuation of International Application No. PCT/CN2018/096184, filed Jul. 18, 2018, the entire content of which is incorporated herein by reference.

FIELD OF THE DISCLOSURE

The present disclosure generally relates to the field of battery, and, more particularly, relates to a battery status indication method, a battery status indication apparatus, and a mobile device.

BACKGROUND

With a development of high technology and an emphasis on environmental protection, as alternatives to non-renewable energies such as petroleum and coal, new energy batteries including lithium batteries, have attracted much attention. In recent years, a demand for batteries is increasing, and performance requirements for the batteries are getting higher and higher. However, due to poor performances of some batteries in a low temperature environment, it is difficult to meet people's needs in some applications. In order to improve a performance of a battery in the low temperature environment, the battery is usually equipped with a heating system. When the battery is used in the low temperature environment, the heating system is first turned on to heat the battery, and increase a battery temperature to improve the performance of the battery, so as to meet a need of use in the low temperature environment.

BRIEF SUMMARY OF THE DISCLOSURE

This application provides a low-cost battery status indication method, a battery status indication apparatus, and a mobile device.

An aspect of the present application provides a battery status indication method. The battery status indication method includes: obtaining a power level and a heat state of a battery, the heat state including an unheated state and a heating state; determining a display mode of indicator lights according to the power level and the heat state of the battery; and controlling the indicator lights to display according to the display mode, to indicate the power level and the heat state of the battery.

Another aspect of the present application provides a battery status indication apparatus. The battery status indication apparatus includes: a plurality of indicator lights configured to indicate a power level and a heat state of a battery; and a controller electrically connected to the indicator lights and configured to: obtain the power level and the heat state of the battery; according to the power level and the heat state of the battery, determine a display mode of the indicator lights; and control the indicator lights to display according to the display mode. The heat state includes an unheated state and a heating state.

Another aspect of the present application provides a mobile device. The mobile device includes: a housing member; a propulsion component configured to drive the housing member to move; a battery configured to provide electrical energy for the propulsion component; a heating system configured to heat the battery; and a battery status indication apparatus configured to indicate a power level and a heat state of the battery. The battery status indication apparatus includes: a plurality of indicator lights configured to indicate a power level and a heat state of the battery; and a controller electrically connected to the indicator lights and configured to: obtain the power level and the heat state of the battery; according to the power level and the heat state of the battery, determine a display mode of the indicator lights; and control the indicator lights to display according to the display mode. The heat state includes an unheated state and a heating state.

The battery status indication method of the present application controls the indicator lights to indicate both a power level and a heat state of a battery, so that the indicator lights are reused without adding additional display devices. Therefore, a cost is low, and it is conducive to uses of miniaturized devices.

BRIEF DESCRIPTION OF THE DRAWINGS

In order to more clearly illustrate the technical solutions in embodiments of the present application, the following briefly introduces accompanying drawings that need to be used in a description of the embodiments. Obviously, the accompanying drawings in the following description are only some embodiments of the application. For those skilled in the art, other accompanying drawings can be obtained based on the accompanying drawings without creative efforts.

DETAILED DESCRIPTION

The following will clearly and completely describe technical solutions in embodiments of the present application with reference to the accompanying drawings in the embodiments of the present application. Obviously, the described embodiments are only part of the embodiments of the present application, rather than all the embodiments. Based on the embodiments in the present application, all other embodiments obtained by those skilled in the art without creative work shall fall within the protection scope of the present application.

Exemplary embodiments will be described in detail here. The examples are shown in the accompanying drawings. When the following description refers to the accompanying drawings, unless otherwise indicated, same numbers in different accompanying drawings indicate same or similar elements. Implementation manners described in the following exemplary embodiments do not represent all implementation manners consistent with the present application. On the contrary, they are only examples of devices and methods consistent with some aspects of the present application as detailed in appended claims.

Terms used in the present application are only for a purpose of describing specific embodiments, not intended to limit the present application. The singular forms of "a", and "the" used in the present application and the appended claims are also intended to include plural forms, unless the context clearly indicates other meanings. It should also be understood that a term "and/or" as used herein refers to and includes any or all possible combinations of one or more associated listed items. Unless otherwise indicated, similar words such as "front", "rear", "lower" and/or "upper" are only for a convenience of description and are not limited to a position or a spatial orientation. Similar words such as "connection" or "link" are not limited to physical or mechanical connections and may include whether direct or indirect electrical connections. "Plurality" means at least two.

A battery status indication method of the present application includes: obtaining a power level and a heat state of a battery, the heat state including an unheated state and a heating state; determining a display mode of indicator lights according to the obtained power level and the obtained heat state of the battery; and controlling, according to the determined display mode of the indicator lights, the indicator lights to display in the display mode, to indicate the power level and the heat state of the battery. The battery status indication method of the embodiment of the present application controls the indicator lights to indicate the power level and the heat state of the battery, so that the indicator lights are reused without adding additional display devices. Therefore, a cost is low, and it is conducive to uses of miniaturized devices.

A battery status indication apparatus of the present application includes a plurality of indicator lights and a controller. The plurality of indicator lights is configured to indicate a power level and a heat state of a battery. The controller is electrically connected to the indicator lights and configured to: obtain the power level and the heat state of the battery; according to the obtained power level and the obtained heat state of the battery, determine a display mode of the indicator lights; and according to the determined display mode of the indicator lights, control the indicator lights to display in the display mode. The heat state includes an unheated state and a heating state.

A mobile device of the present application includes a housing member, a propulsion component, a battery, a heating system and a battery status indication apparatus. The heating system is configured to heat the battery. The propulsion component is configured to drive the housing member to move. The battery is configured to provide electrical energy for the propulsion component. The battery status indication apparatus is configured to indicate a power level and a heat state of the battery. The battery status indication apparatus includes: a plurality of indicator lights and a controller. The plurality of indicator lights is configured to indicate a power level and a heat state of a battery. The controller is electrically connected to the indicator lights and configured to: obtain the power level and the heat state of the battery; according to the obtained power level and the obtained heat state of the battery, determine a display mode of the indicator lights; and according to the determined display mode of the indicator lights, control the indicator lights to display in the display mode. The heat state includes an unheated state and a heating state.

The battery status indication method, the battery status indication device and the mobile device of the present application will be described in detail below with reference to the accompanying drawings. In the case of no conflict, following examples and features in the implementations can be combined with each other.

Figure 1:
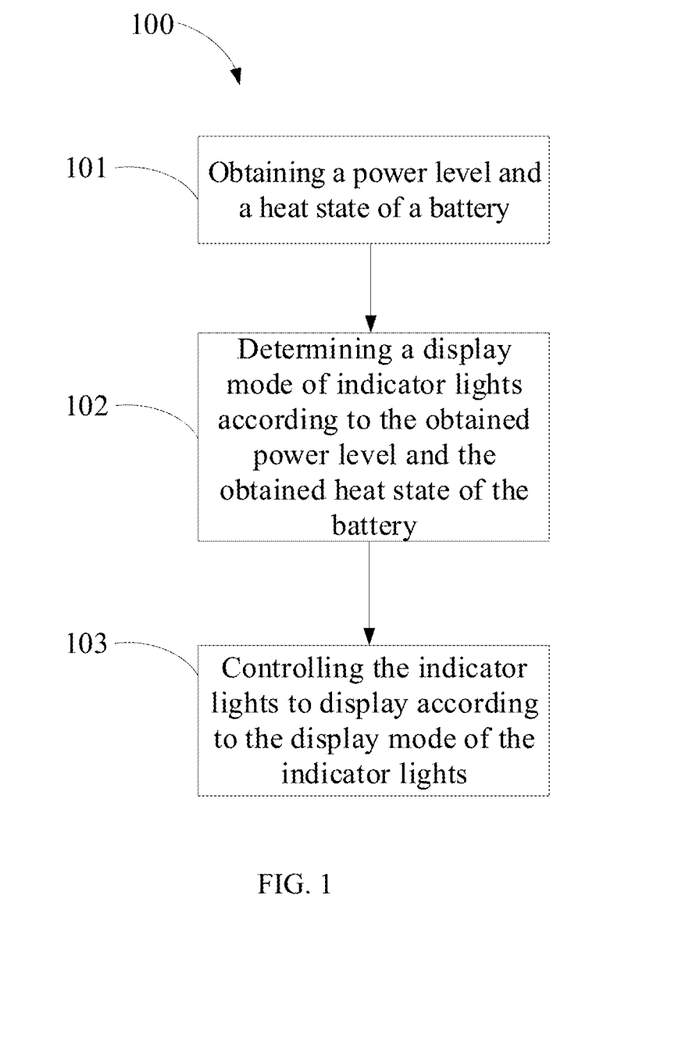
FIG. 1 illustrates a flowchart of an embodiment of a battery status indication method of the present application.

FIG. 1 illustrates a flowchart of an embodiment of a battery status indication method 100 of the present application. The battery status indication method 100 is configured to indicate a power level and a heat state of a battery. The battery includes a lithium battery but is not limited to the lithium battery. The battery status indication method 100 includes steps 101-103.

S101: Obtaining a power level and a heat state of the battery.

In some embodiments, the battery includes a smart battery. The smart battery has a built-in battery chip. The battery chip can obtain and store the power level of the battery. The power level of the battery can be read from the battery chip of the smart battery. In other embodiments, the battery includes an ordinary battery without the built-in battery chip. The power level of the battery can be detected by an external detection circuit.

The heat state includes an unheated state and a heating state. In a low temperature environment, in order to ensure that a performance of the battery meets a demand, the battery is heated, and at this time the battery is in the heating state. When an ambient temperature is high, the battery is not heated, and at this time the battery is in the unheated state. In some embodiments, the heat state includes a heat preservation state. When the battery is heated to a desired temperature, the battery can be kept warm to make a temperature of the battery basically maintained at or near the desired temperature.

S102: Determining a display mode of the indicator lights according to the obtained power level and the obtained heat state of the battery.

The indicator light may include a LED light. In some embodiments, the S102 of determining the display mode of the indicator lights includes determining number of indicator lights, and the display mode of the determined number of indicator lights. The power level and the heat state of the battery are indicated by number of indicator lights to be turned on and the display mode of the number of indicator lights.

Figure 2:
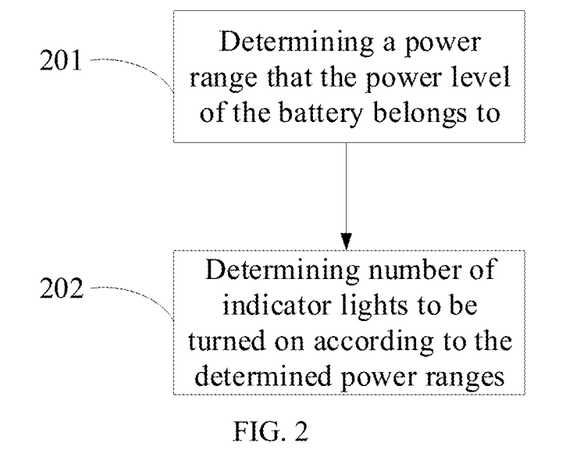
FIG. 2 illustrates a sub-flowchart of an embodiment of sub-steps determining a display mode of the indicator lights of the battery status indication method shown in FIG. 1.

In some embodiments, the number of indicator lights to be turned on can indicate the power level of the battery. According to the power level of the battery, the number of indicator lights to be turned on is determined. In one embodiment, the greater the number of indicator lights to be turned on, the more power level of the battery, otherwise the less the power level of the battery. In one embodiment, steps of determining the number of indicator lights to be turned on according to the power level of the battery includes sub-steps 201 and 202, as shown in FIG. 2

S201: Determining a power range of the battery.

Figure 3:
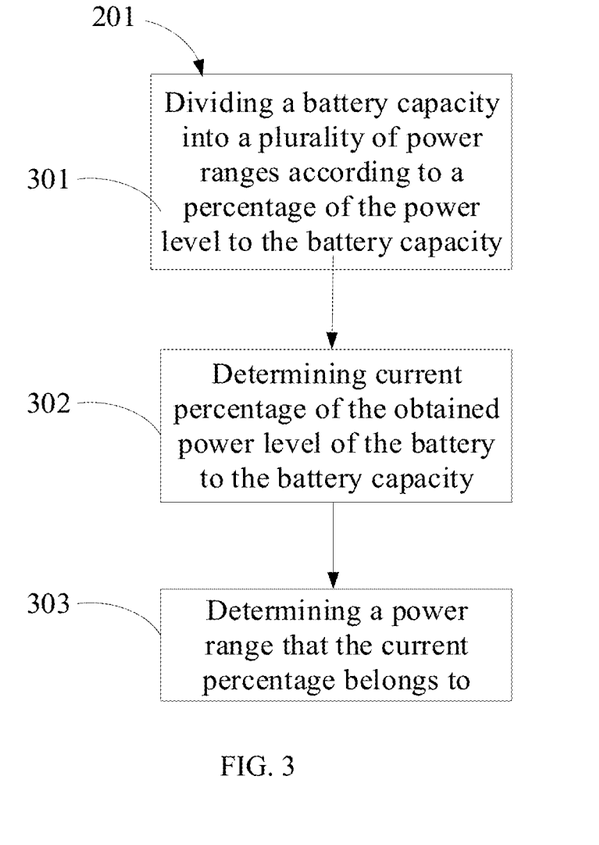
FIG. 3 is a sub-flowchart of an embodiment of determining a power range of the battery shown in FIG. 2.

In one embodiment, as shown in FIG. 3, the sub-step 201 of determining the power range of the battery includes sub-steps 301-303. In sub-step 301, according to a percentage of the power level to a battery capacity, the battery capacity is divided into a plurality of power ranges, and the power ranges are percentage ranges. For example, the percentage can be divided into four ranges: 0%~25%, 25%~50%, 50%~75%, 75%~100%. In other embodiments, the percentage can be divided into other numbers of consecutive ranges. The percentage can be divided equally or unequally. Number of power ranges can be equal to number of indicator lights. Or the number of power ranges can be less than the number of indicator lights.

In sub-step 302, current percentage of the obtained power level of the battery to the battery capacity is determined. The current percentage can be determined by calculating the ratio of the power level of the battery to the battery capacity. In sub-step 303, a power range of the current percentage is determined. The power range of the current percentage can be determined by comparison. Comparing the current percentage with minimum percentages and maximum percentages of the power ranges may determine a range of the current percentage. Using the above-described four percentage ranges as an example, when the current percentage is 30%, after comparing the current percentage with the range 25%~50% whose minimum percentage is 25% and maximum percentage is 50%, it is determined that the current percentage falls into the 25%~50% range. Therefore, the power range of the battery is determined.

In another embodiment, a total range of power level from 0 to the battery capacity can be divided into a plurality of continuous power ranges. The power ranges are ranges that reflect power level values. The plurality of power ranges can also be divided equally or unequally. The power range of the battery can be determined by comparison.

Returning to FIG. 2, in sub-step 202, number of indicator lights to be turned on is determined according to the determined power range.

Different power ranges correspond to the number of different indicator lights. An approximate power level of the battery can be known by the number of indicator lights to be turned on. In one embodiment, the number of indicator lights to be turned on is positively correlated with the power ranges. The greater the value of the power range, the greater the number of corresponding indicator lights. Therefore, the more the indicator lights being turned on are turned on, the more power level of the battery is indicated.

Figure 4:
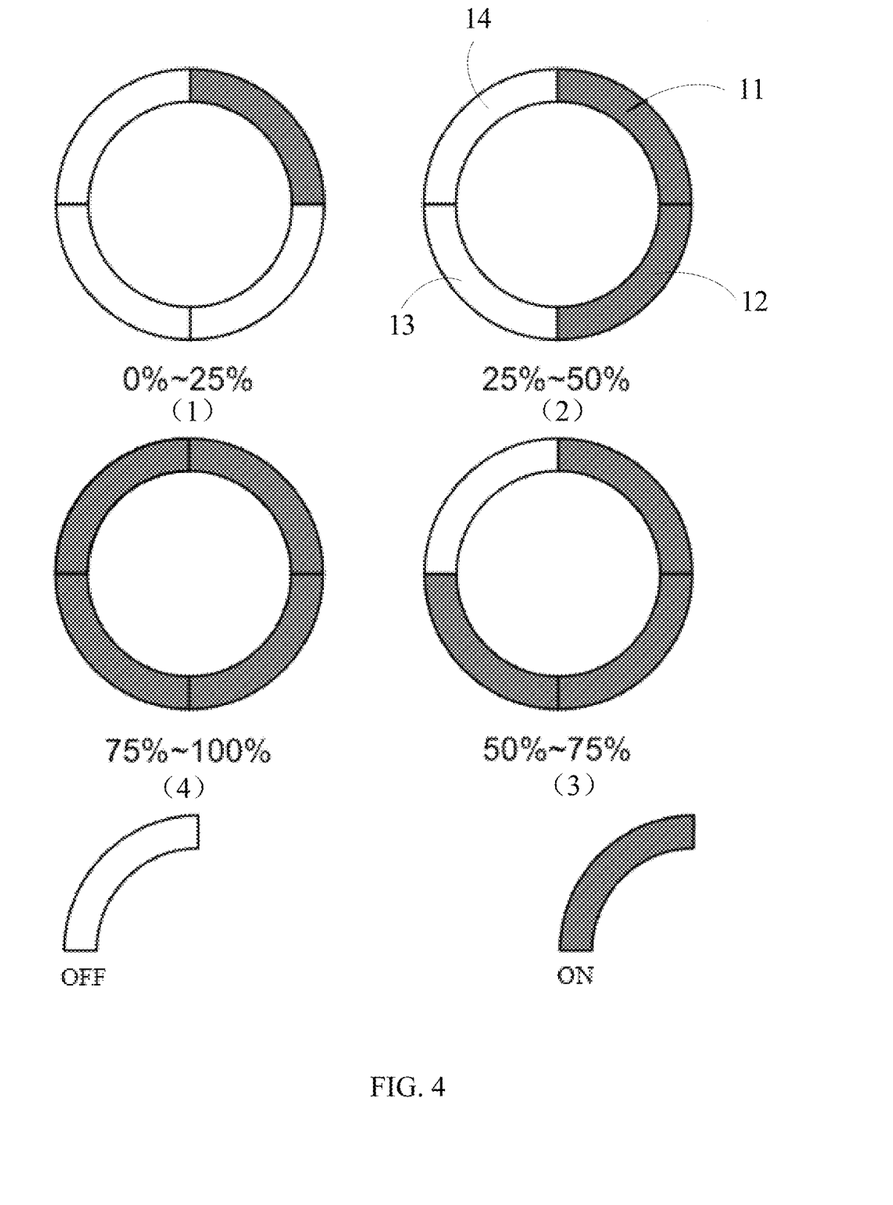
FIG. 4 illustrates a schematic diagram of a display mode of indicator lights of the present application.

For example, as shown in FIG. 4, four indicator lights 11-14 are arranged in a ring. When the current percentage corresponding to the power level of the battery is within the range of 0% to 25%, as shown in FIG. 4 (1), an indicator light 11 is lit. When the current percentage is within the range of 25%~50%, as shown in FIG. 4 (2), two indicator lights 11 and 12 are lit. When the current percentage is within the range of 50%~75%, as shown in FIG. 4 (3), three indicator lights 11-13 are lit. When the current percentage is in the range of 75%~100%, as shown in FIG. 4 (4), four indicator lights 11-14 are lit. FIG. 4 is only an example and is not limited to the example of FIG. 4. In other embodiments, the number of indicator lights is not limited to four, and an arrangement of the indicator lights may be in a strip shape or other shapes.

In some embodiments, a display mode of the indicator lights is determined according to a heat state of the battery. The display mode of a determined number of indicator lights to be turned on is different, which can indicate different heat states. Therefore, the number of indicator lights to be turned on and the display mode can indicate the power level and the heat state of the battery at a same time. In some embodiments, the display mode includes a mode of a brightness of the indicator lights being turned on remaining unchanged and/or a flashing mode of the indicator lights.

In some embodiments, the mode of the brightness of the indicator lights being turned on remaining unchanged includes: the brightness of the indicator lights being different in different heat states, and the brightness remaining unchanged in a same heat state. Different heat states can be indicated by the different brightness of the indicator lights being turned on. For example, the brightness of the indicator lights in the heating state is higher than the brightness of the indicator lights in the unheated state. The brightness of the indicator lights in the heat preservation state is higher than the brightness of the indicator lights in the heating state. Large differences may be set between different brightness levels, which can facilitate users to intuitively perceive brightness differences and recognize different heat states.

In some other embodiments, different heat states are indicated by the mode of the brightness of the indicator lights being turned on remaining unchanged and by the flashing mode of the indicator lights. In one or more heat states, the mode of the brightness of the indicator lights being turned on remaining unchanged may be adopted. In another one or more states, the mode of indicator lights flashing may be adopted.

In one embodiment, in the unheated state, it is determined that the display mode of the indicator lights includes the mode of the brightness of the indicator lights being turned on remaining unchanged. For example, as shown in FIG. 4, in the unheated state, the brightness of the indicator lights being turned on remains unchanged and can be a full brightness. Therefore, the indicator lights shown in FIG. 4 indicate that the battery is in the unheated state while indicating the power level of the battery. In other embodiments, the brightness of the indicator lights can be kept a semi-brightness or other brightness.

In one embodiment, in the heating state, it is determined that the display mode of the indicator lights includes the flashing mode of the indicator lights. In the heat preservation state, it is determined that the display mode of the indicator lights includes the flashing mode of the indicator lights is determined. The flashing mode of the indicator lights in the heat preservation state is different from the flashing mode of the indicator lights in the heating state, thereby distinguishing the heat preservation state and the heating state. The brightness of the indicator lights does not change in the unheated state, so that the unheated state can be distinguished from the heat preservation state and the heating state.

Figure 5:
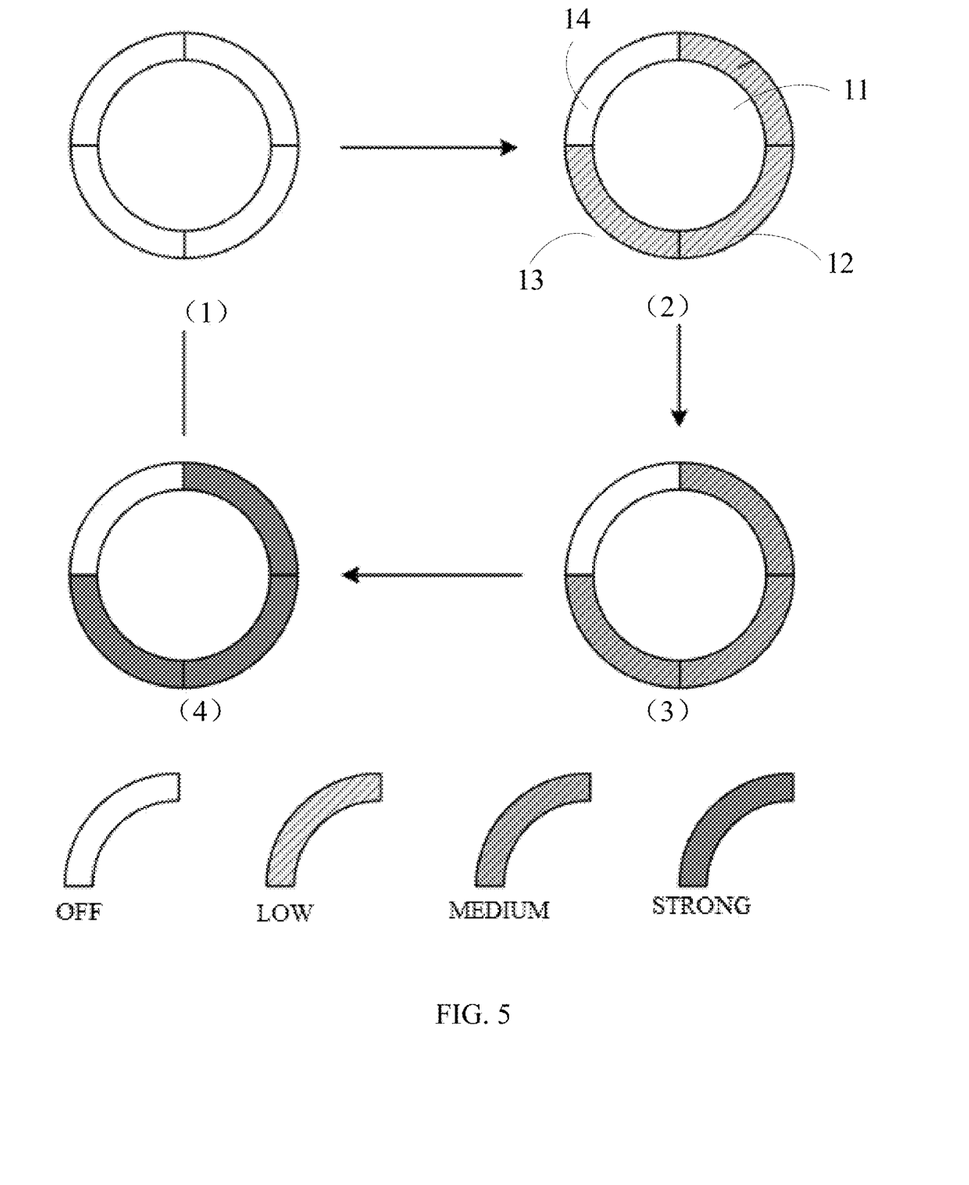
FIG. 5 illustrates a schematic diagram of another display mode of indicator lights of the present application.

The flashing mode of the indicator lights includes at least one of a mode of the brightness of the indicator lights gradually changing, and a mode of the indicator lights alternating between on and off. The mode of the brightness of the indicator lights gradually changing includes: the brightness of the indicator lights cyclically changing from low to high or from high to low gradually. In one embodiment, the brightness of the indicator lights starts from off and is gradually increased to the full brightness, and then the brightness is gradually increased from off, the brightness changes in cycles like this. For example, as shown in FIG. 5, taking the current percentage corresponding to the power level of the battery in the range of 50% to 75% as an example, the brightness of indicator lights 11-13 gradually changes. From FIG. 5(1) to FIG. 5(4), the brightness of the three indicator lights 11-13 start from off, is increased to a low brightness, to a medium brightness (such as the semi-brightness), to a strong brightness (such as the full brightness), which is a cycle. The brightness of the three indicator lights 11-13 gradually transition from off to the strong brightness and changes in cycles like this. In the example shown in FIG. 5, four brightness levels (including the indicator lights being turned off) are set and change cyclically. In other embodiments, more brightness levels can be set to make the brightness change more consistent.

In another embodiment, the brightness of the indicator lights starts from the full brightness, is gradually decreased, and can be decreased to off, then the brightness is gradually reduced from the full brightness and changes in cycles like this. For example, in FIG. 5, the brightness of the indicator lights is displayed one by one from FIG. 5 (4) to FIG. 5 (1), which is a cycle. In another embodiment, the brightness of the indicator lights changes from low to high and then from high to low and changes in cycles like this. The brightness of the indicator lights can be gradually increased from off to the full brightness, and then can be gradually decreased from the full brightness to off, which is a cycle. In another embodiment, the brightness of the indicator lights changes from high to low and then from low to high and changes in cycles like this. The brightness of the indicator lights can be gradually decreased from the full brightness to off, and then can be gradually increased from off to the full brightness, which is a cycle.

Figure 6:
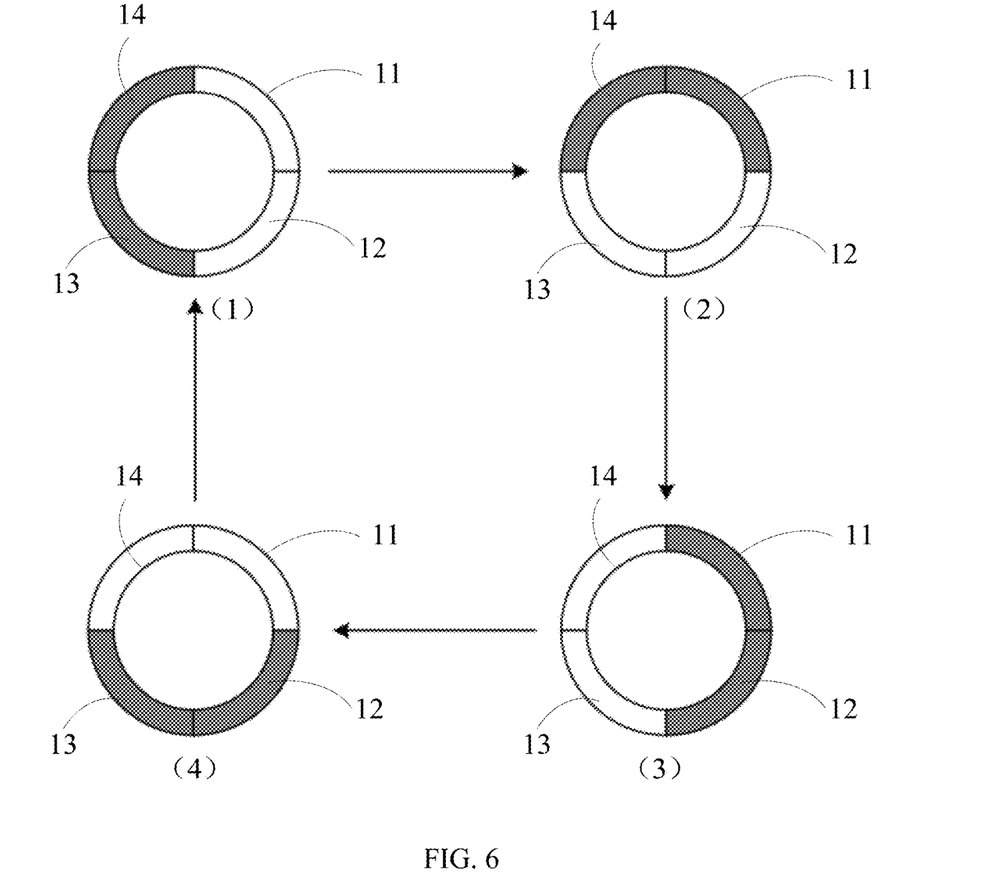
FIG. 6 illustrates a schematic diagram of another display mode of indicator lights of the present application.

In some embodiments, the mode of the indicator lights alternating between on and off includes: a mode of the indicator lights chasing cyclically. For example, as shown in FIG. 6, taking the current percentage corresponding to the power level of the battery in the range of 25% to 50% as an example, from FIG. 6(1) to FIG. 6(4), two indicator lights being turned on display the chasing effect clockwise and turn an angle of one indicator light each time. Adjacent indicator lights 13 and 14 in FIG. 6(1) are lit. In FIG. 6(2), the same indicator light 14 as shown in FIG. 6(1) and the other adjacent indicator light 11 are lit. By analogy, the indicator lights 11 and 12 are lit in FIG. 6(3), and the indicator lights 12 and 13 are lit in FIG. 6(4) and the indicator lights display the chasing effect clockwise. In other embodiments, the indicator lights may display the chasing effect counterclockwise. In other embodiments, when a plurality of indicator lights is arranged in a strip shape or other shape, the chaser light display can be realized by sequentially shifting the display in a direction starting from an indicator light.

In some embodiments, the mode of the indicator lights alternating between on and off includes fixed indicator lights alternating between on and off. For example, the fixed indicator lights 11 and 12 in FIG. 6 alternates between being turned on and off. Number of the fixed indicator lights is the number of indicator lights to be turned on determined according to the power level of the battery. The fixed indicator lights are turned on and off alternately. Therefore, the power level and at least one heat state of the battery can be indicated.

In some embodiments, in a state of the heating state and the heat preservation state, it is determined that the display mode of the indicator lights includes the mode of the brightness of the indicator lights gradually changing. In the other state of the heating state and the heat preservation state, it is determined that the display mode of the indicator lights includes the mode of the indicator lights chasing cyclically. Therefore, the heating state and the heat preservation state can be clearly distinguished, which is convenient for users to recognize.

In one embodiment, the display mode of the indicator lights in the heating state may be the mode of the brightness of the indicator lights gradually changing, as shown in an example in FIG. 5. The display mode of the indicator lights in the heat preservation state may include the mode of the indicator lights chasing cyclically, as shown in an example in FIG. 6. The indicator lights shown in FIG. 5 can indicate that the power level of the battery is in the range of 50% to 75%, and at a same time indicate that the battery is heating. The indicator lights shown in FIG. 6 can indicate that the power level of the battery is in the range of 25% to 50%, and at a same time indicate that the battery is in the heat preservation state. The mode of the brightness of the indicator lights gradually changing is used to indicate the heating state, which is close to a meaning of "heating in progress" and is in line with a habit of general users. The mode of the indicator lights chasing cyclically is used to indicate the heat preservation state, which is close to a meaning of "heating has been completed, waiting for use" and is in line with a habit of general users. Therefore, the display method is user-friendly and improves a user experience.

In another embodiment, the display mode of the indicator lights in the heating state may include the mode of the indicator lights chasing cyclically. The display mode of the indicator lights in the heat preservation state may be the mode of the brightness of the indicator lights gradually changing.

In one embodiment, the number of the indicator lights is equal to the number of the power ranges. When some of the indicator lights corresponding to the power range of the battery are lit, a heat state can be indicated by chaser lights. When all the indicator lights corresponding to the power range of the battery are lit, the heat state can be indicated by other display method, which is different from the display modes in other heat states. For example, all indicator lights can alternate between being turned on and off to indicate that the power level is in a maximum power range and the battery is in a heat preservation state. In another embodiment, the number of indicator lights is greater than the number of power ranges. Part of the indicator lights corresponding to the power range of the battery are lit, so that the heat state can be displayed by cyclic chaser lights.

In some other embodiments, the display modes of the indicator lights are different flashing modes in the unheated state, the heating state and the heat preservation state. For example, in one state of the unheated state, heating state, and heat preservation state, the display mode is the mode of the brightness of the indicator lights gradually changing. In another state, the display mode is the mode of the indicator lights chasing cyclically. In the other state, the display mode is the mode of the indicator lights alternating between on and off.

In some other embodiments, the number of indicator lights to be turned on can be determined according to the heat state. The display mode of the indicator lights being turned on can be determined according to the power level of the battery. Different heat states are indicated by different numbers of lit indicator light. For example, one indicator light is on to indicate the unheated state; two indicator lights are on to indicate the heating state; three indicator lights are on to indicate the heat preservation state. Different power levels are indicated by different display modes of the number of indicator lights to be turned on. For example, the brightness of the indicator lights is positively related to the power level of the battery. The higher the brightness of the indicator lights, the more power level the brightness of the indicator lights indicates, otherwise the less power level the brightness of the indicator lights indicates. For example, when the power level of the battery is lower than a minimum power level threshold, the indicator lights flash on and off.

Returning to FIG. 1, in step 103, the indicator lights are controlled to display according to the determined display mode of the indicator lights, to indicate the power level and the heat state of the battery.

The battery status indication method used to control the indicator lights can not only indicate the power level of the battery, but also the heat state. The indicator lights are multiplexed, and no additional display device is added. Therefore, a cost is low, and it is conducive to uses of miniaturized devices. Moreover, in contrast to solutions that specifically display detailed information such as a temperature value of the battery, a heating power level value, and the power level of the battery, embodiments of the present application use the number of indicator lights to be turned on and the display mode of the indicator lights being turned on to indicate the power level and the heat state of the battery, and does not display too much professional information. The display modes are more friendly and improve the user experience, reduces a user's learning cost and enhances product ease of use. In addition, the battery status indication method solves a problem of single display mode and insufficient information of LED lights and other indicator lights.

Figure 7:
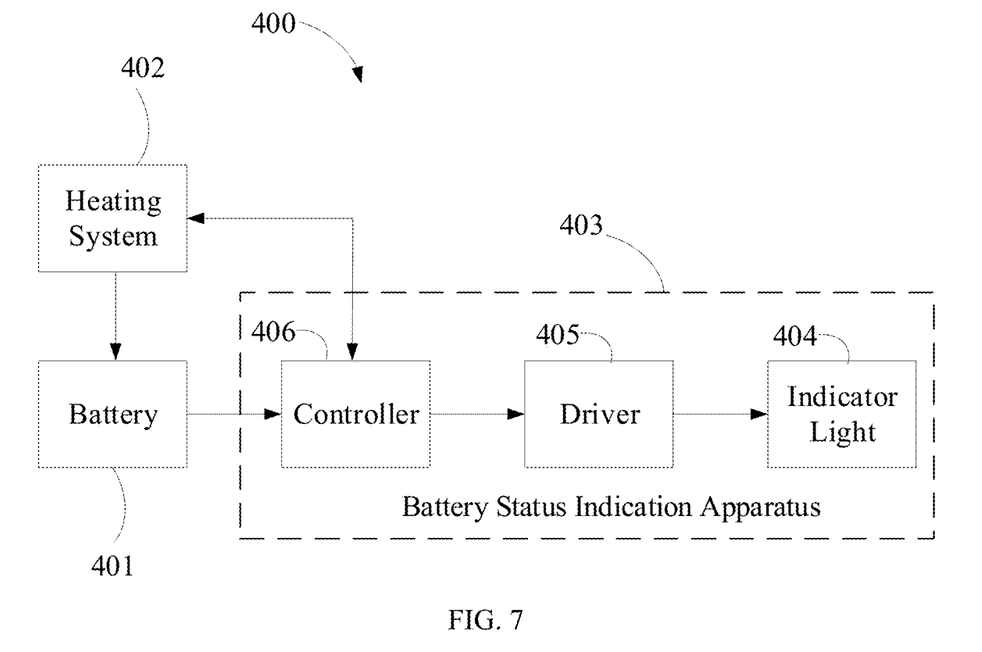
FIG. 7 illustrates a functional block diagram of an embodiment of a mobile device of the present application.
Figure 8:
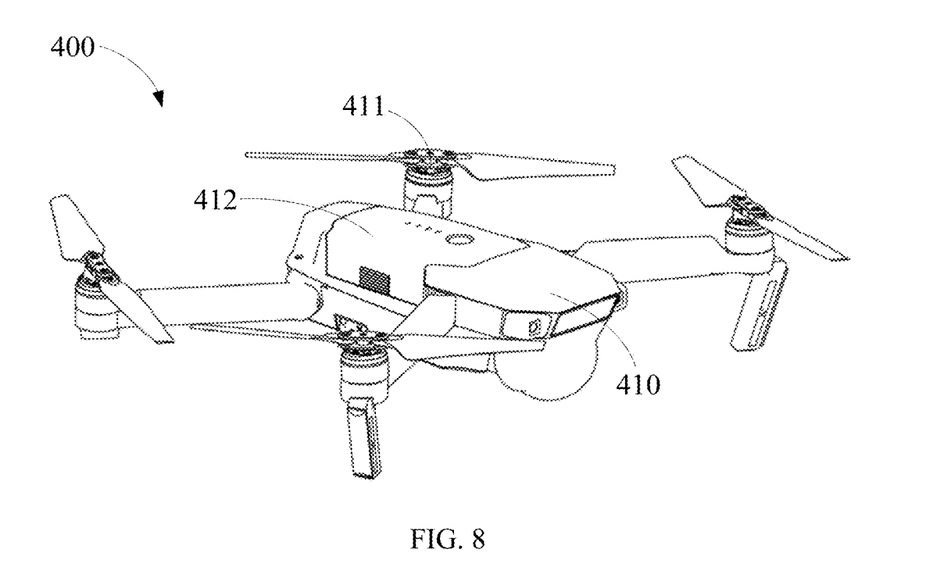
FIG. 8 illustrates a three-dimensional schematic diagram of an embodiment of a mobile device of the present application.

FIG. 7 illustrates a functional block diagram of an embodiment of a mobile device 400 of the present application. FIG. 8 illustrates a three-dimensional schematic diagram of an embodiment of the mobile device 400. In the illustrated embodiment, the mobile device 400 is an unmanned aerial vehicle. In other embodiments, the mobile device 400 may be a robot, an unmanned mobile vehicle, an unmanned mobile boat, or an underwater mobile device. The mobile device 400 includes a housing member 410, a propulsion component 411, a battery 401, a heating system 402, and a battery status indication apparatus 403. The propulsion component 411 is used to drive the housing member 410 to move. The propulsion component 411 may include a motor and a propeller.

The battery 401 is used to provide electrical energy for the power level component 411. The battery 401 can provide power level to the motor, and can also provide power level to other components of the mobile device 400, such as a controller of a mobile platform, etc., to provide power level to the mobile device 400 to move and work.

The heating system 402 is used to heat the battery 401. When an ambient temperature is low, the heating system 402 heats the battery 401 to increase a temperature of the battery 401, thereby improving a performance of the battery 401. When the temperature of the battery 401 reaches a desired temperature, the heating system 402 can stop heating and keep the battery 401 at the desired temperature. When the ambient temperature is high, the battery 401 may not be heated, and the heating system 402 does not work.

The battery status indication apparatus 403 is used to indicate the power level and the heat state of the battery 401. The battery status indication apparatus 403 includes a plurality of indicator lights 404 and a controller 406 electrically connected to the indicator lights 404. The battery status indication apparatus 403 may further include a driver 405 configured to receive control signals from the controller 406 and drive the indicator lights to display according to the received control signals. The indicator lights 404 are used to indicate the power level and the heat state of the battery 401. As shown in FIGS. 4-6, the plurality of indicator lights 404 may be arranged in a ring. Of course, the plurality of indicator lights 404 may also be arranged in another way. In some embodiments, the indicator lights 404 includes LED lights. The LED lights used as the indicator lights lower a cost. The low-cost LED lights are used to indicate the power level and the heat state of the battery at a same time. Therefore, the low-cost LED lights are reused to make the cost even lower. Moreover, the LED light has a smaller footprint compared to the LED digital tube or LCD display, which is more conducive to miniaturizations of the battery status indication apparatus 403 and the mobile device 400.

Figure 9:
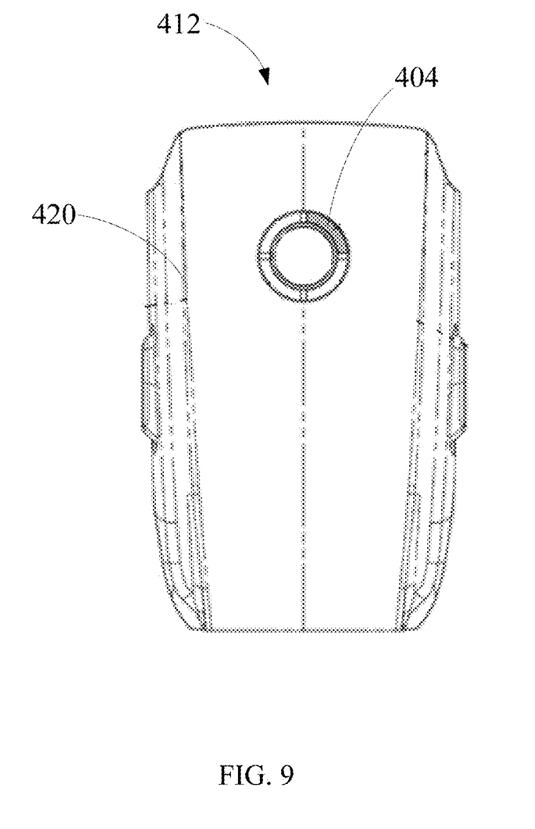
FIG. 9 illustrates a front view of a battery assembly of a mobile device shown in FIG. 8.

In some embodiments, the battery status indication apparatus 403 and the battery 401 are integrated to form the battery 401 and assembled in the housing member 410. For example, in one embodiment shown in FIG. 8, the battery assembly 412 includes the battery status indication apparatus 403 and the battery 401 integrated together. The battery assembly 412 is detachably assembled to the housing member 410. The battery assembly 412 can be housed on a top of the housing member 410. FIG. 9 illustrates a front view of the battery assembly 412. The battery assembly 412 includes a housing 420. The housing 420 of the battery assembly 412 can be spliced with the housing member 410. The battery 401 and the controller 406 are housed in the housing 420. The indicator lights 404 are disposed on the housing 420 and are exposed from a surface of the housing 420.

In some other embodiments, the battery status indication apparatus 403 and the battery 401 are assembled in the housing member 410 separately. The indicator lights 404 are disposed in the housing member 410. The controller 406 of the battery status indication apparatus 403 is installed in the housing member 410. The indicator lights 401 are exposed on the housing member 410. The battery 401 is detachably assembled to the housing member 410.

Continuing to refer to FIG. 7, the controller 406 is used to obtain the power level and the heat state of the battery 401, and determine the display mode of the indicator lights 404 according to the obtained power level and heating state of the battery 401. According to the determined display mode of the indicator lights 404, the control indicator lights 404 are displayed according to the display mode. In one embodiment, the controller 406 is connected to the battery 401 and configured to obtain the power level of the battery 401 from the battery 401.

In one embodiment, the controller 406 is connected to the heating system 402 to control the heating system 402 to heat the battery 401 and obtain the heat state of the battery 401 from the heating system 402. The controller 406 can obtain a temperature of the battery 401 and control an operation of the heating system 402 according to the temperature of the battery 401. The temperature of the battery 401 can be measured by a temperature sensor built into the battery 401. The measured temperature is provided to the controller 406.

The controller 406 may determine an operating mode of the heating system 402 according to the temperature of the battery 401. When the temperature of the battery 401 is not lower than a temperature threshold, the controller 406 controls the heating system 402 not to work to heat the battery 401. At the time, the battery 401 is in the unheated state. When the temperature of the battery 401 is lower than a temperature threshold, the controller 406 controls the heating system 402 to heat the battery 401. At the time, the battery 401 is in the heating state. When the temperature of the battery 401 reaches the temperature threshold, the heating system 402 is controlled to stop heating the battery 401 and keep the temperature of the battery 401. At the time, the battery 401 is in the heat preservation state.

In one embodiment, the controller 406 may obtain the heat state of the battery 401 from a working state of the heating system 402 and may directly obtain the working state of the heating system 402 from the heating system 402. In another embodiment, the controller 406 may determine the heat state of the battery 401 from an operating mode of the heating system 402 determined by the temperature of the battery 401.

In some embodiments, the controller 406 is used to determine the number of indicator lights to be turned on 404, and the display mode of the determined number of indicator lights to be turned on 404. In one embodiment, the controller 406 is used to determine the number of indicator lights to be turned on 404 according to the power level of the battery 401. In some embodiments, the controller 406 is used to determine the power range of the battery 401 and determine the number of the indicator lights 404 according to the determined power range. Different power ranges correspond to different numbers of the indicator lights being turned on 404. In some embodiments, the number of indicator lights to be turned on 404 is positively correlated with the power ranges.

In some embodiments, the controller 406 is used for: according to a percentage of the power level to a power level capacity of the battery 401, dividing the power level capacity into a plurality of power ranges, the power ranges being percentage ranges; determining a current percentage of the obtained power level of the battery 401 to the power level capacity of the battery 401; and determining the power range of the current percentage.

In some embodiments, the controller 406 is used to determine the display mode of the number of indicator lights 404 according to the heat state of the battery 401. In some embodiments, the display mode includes the mode of the brightness of the indicator lights being turned on remaining unchanged and/or the flashing mode of the indicator lights. In some embodiments, the flashing mode of the indicator lights includes at least one mode of: the brightness of the indicator lights gradually changing, or the mode of the indicator lights being turned on and off. In some embodiments, the mode of the brightness of the indicator lights gradually changing includes: the brightness of the indicator lights gradually changing cyclically from low to high or from high to low. In some embodiments, the mode of the indicator lights alternating between on and off includes the mode of the indicator lights chasing cyclically.

In some embodiments, the controller 406 is used for in the unheated state, determining that the display mode of the indicator lights 404 includes the mode of the brightness of the indicator lights being turned on remaining unchanged. The controller 406 is used for in the heating state, determining that the display mode of the indicator lights 404 includes the flashing mode of the indicator lights. The controller 406 is used for in the heat preservation state, determining that the display mode of the indicator lights 404 includes the flashing mode of the indicator lights. The flashing mode of the indicator lights in the heat preservation state is different from the flashing mode of the indicator lights in the heating state.

In some embodiments, the controller 406 is used for in one state of the heating state and the heat preservation state, determining that the display mode of the indicator lights 404 includes the mode of the brightness of the indicator lights gradually changing; and in the other state of the heating state and the heat preservation state, determining that the display mode of the indicator lights 404 includes the mode of the indicator lights chasing cyclically.

In some embodiments, the indicator lights 404 have different brightness under different heat states, and the brightness remains unchanged under a same heating state.

The controller 406 may be used to execute steps and sub-steps of the battery status indication method 100. The controller 406 may include a microprocessor (such as a single-chip microcomputer) and related circuit components connected to the microprocessor.

In some embodiments, the controller 406 includes a control module and a driving module. The control module controls the driving module to drive the indicator lights 404 to display. In one embodiment, the control module and the driving module are integrated in a chip. The control module includes the chip and related electronic components connected to the chip.

In other embodiments, the driving module and the control module may be independent of each other. The control module may include a chip such as a microprocessor or the like. The driving module may include a driving circuit. The driving circuit can include a triode and a resistor connected to the triode, for driving LED lights.

The controller 406 may include a brightness adjustment module. The control module can control the brightness adjustment module to adjust a working current of the indicator lights 404 during a period, which may include an instantaneous current or an average current, to adjust the brightness of the indicator lights. The brightness adjustment module can adjust the brightness of the indicator lights 404 through a Pulse width modulation (PWM) dimming mode, a thyristor chopper dimming mode or an analog voltage dimming mode. The brightness adjustment module may be integrated with the driving module and the control module, or the brightness adjustment module may be set independently from the driving module and/or the control module.

For a device embodiment, since the device embodiment basically corresponds to a method embodiment, please refer to part of a description of the method embodiment for related details. The method embodiment and the device embodiment are complementary to each other.

It should be noted that in the specification, relational terms such as "first" and "second" are only used to distinguish one entity or operation from another entity or operation, and do not necessarily require or imply that there is any actual relationship or order between the entities or operations. The terms "include", "contain" or any other variations thereof are intended to encompass non-exclusive inclusions, so that a process, method, article, or device including a series of elements includes not only the elements, but also other elements that are not explicitly listed, or also include elements inherent to the process, method, article, or device. If there are no more restrictions, the element defined by a sentence "including a . . . " does not exclude an existence of other same elements in the process, method, article, or device including the element.

The method and device provided by the embodiments of the present invention are described in detail above. Specific examples are used in the specification to illustrate principles and implementations of the present invention. The description of the above embodiments is only used to help understand methods of the present invention and its core ideas. Meanwhile, for those skilled in the art, according to the ideas of the present invention, there may be changes in specific implementations and specific scopes of the application. In summary, the content of this specification should not be construed as a limitation of the present invention.

The content disclosed in this patent document contains copyrighted materials. The copyrights belong to the copyright owner. The copyright owner does not object to anyone copying the patent document or the patent disclosure in the official records and archives of the Patent and Trademark Office.

What is claimed is:
1. A battery status indication method, comprising:
obtaining a power level and a heat state of a battery, the heat state including an unheated state, a heating state, and a heat preservation state;

determining a display mode of at least one indicator according to the power level and the heat state of the battery, the display mode of the at least one indicator for the unheated state, the display mode of the at least one indicator for the heating state, and the display mode of the at least one indicator for the heat preservation state being different from each other; and controlling the at least one indicator to display according to the display mode, to indicate the power level and the heat state of the battery.

2. The battery status indication method according to claim 1, wherein determining the display mode of the at least one indicator according to the power level and the heat state of the battery, includes:

determining a number of one or more indicators of the at least one indicator to be turned on and the display mode of the number of the one or more indicators.

3. The battery status indication method according to claim 2, wherein determining the number of one or more indicators to be turned on and the display mode of the number of the one or more indicators, includes:

determining the number of one or more indicators to be turned on according to the power level of the battery.

4. The battery status indication method according to claim 3, wherein determining the number of one or more indicators to be turned on and the display mode of the number of the one or more indicators includes:

determining a power range of the battery; and according to the power range, determining the number of the one or more indicators to be turned on.

5. The battery status indication method according to claim 4, wherein the number of the one or more indicators is positively correlated with the power range.

6. The battery status indication method according to claim 4, wherein determining the power range of the battery includes:

according to a percentage of the power level to a battery capacity, dividing the battery capacity into a plurality of power ranges, the power ranges being percentage ranges;

determining current percentage of the power level of the battery to the battery capacity; and determining the power range of the current percentage.

7. The battery status indication method according to claim 2, wherein determining the number of one or more indicators to be turned on and the display mode of the number of the one or more indicators includes:

determining the display mode of the one or more indicators according to the heat state of the battery.

8. The battery status indication method according to claim 7, wherein the display mode includes at least one of a mode of a brightness of the one or more indicators being turned on remaining unchanged or a flashing mode of the one or more indicators.

9. The battery status indication method according to claim 8, wherein determining the display mode of the one or more indicators according to the heat state of the battery includes:

in the unheated state, determining that the display mode of the one or more indicators includes the mode of the brightness of the one or more indicators being turned on remaining unchanged.

10. The battery status indication method according to claim 8, wherein determining the display mode of the one or more indicators according to the heat state of the battery, includes:

in the heating state, determining that the display mode of the one or more indicators includes the flashing mode of the one or more indicators.

11. The battery status indication method according to claim 10, wherein:

according to the heat state of the battery, determining the display mode of the one or more indicators includes: in the heat preservation state, determining that the display mode of the one or more indicators includes the flashing mode of the one or more indicators; and the flashing mode of the one or more indicators in the heat preservation state is different from the flashing mode of the one or more indicators in the heating state.

12. The battery status indication method according to claim 10, wherein the flashing mode of the one or more indicators includes at least one mode of: the brightness of the one or more indicators gradually changing or the one or more indicators alternating between on and off.

13. The battery status indication method according to claim 12, wherein the mode of the brightness of the one or more indicators gradually changing includes the brightness of the one or more indicators cyclically changing from low to high or from high to low gradually.

14. The battery status indication method according to claim 12, wherein the mode of the one or more indicators alternating between on and off includes: a mode of the one or more indicators chasing cyclically.

15. The battery status indication method according to claim 1, wherein determining the display mode of the at least one indicator according to the power level and the heat state of the battery includes:

in one state of the heating state and the heat preservation state, determining that the display mode of the at least one indicator includes a mode of a brightness of the at least one indicator gradually changing; and in the other state of the heating state and the heat preservation state, determining that the display mode of the indicator lights includes a mode of the at least one indicator chasing cyclically.

16. The battery status indication method according to claim 8, wherein the mode of the brightness of the one or more indicators being turned on remaining unchanged includes: the brightness of the one or more indicators being different in different heating states, and the brightness remaining unchanged in a same heat state.

17. A battery status indication apparatus, comprising:

at least one indicator configured to indicate a power level and a heat state of a battery, the heat state including an unheated state, a heating state, and a heat preservation state; and a controller electrically connected to the at least one indicator and configured to:

obtain the power level and the heat state of the battery;

according to the power level and the heat state of the battery, determine a display mode of the at least one indicator, the display mode of the at least one indicator for the unheated state, the display mode of the at least one indicator for the heating state, and the display mode of the at least one indicator for the heat preservation state being different from each other; and control the at least one indicator to display according to the display mode.

18. The battery status indication apparatus according to claim 17, wherein the controller is configured to determine a number of one or more indicators of the at least one indicator to be turned on and the display mode of the number of the one or more indicators.

19. The battery status indication apparatus according to claim 18, wherein the controller is configured to determine the number of one or more indicators to be turned on according to the power level of the battery.

20. A mobile device, comprising:
a housing member;
a propulsion component configured to drive the housing member to move;
a battery configured to provide electrical energy for the propulsion component;
a heating system configured to heat the battery; and
a battery status indication apparatus configured to indicate a power level and a heat state of the battery, comprising:
at least one indicator configured to indicate the power level and the heat state of the battery, the heat state including an unheated state, a heating state, and a heat preservation state; and
a controller electrically connected to the at least one indicator and configured to:
obtain the power level and the heat state of the battery;
according to the power level and the heat state of the battery, determine a display mode of the at least one indicator, the display mode of the at least one indicator for the unheated state, the display mode of the at least one indicator for the heating state, and the display mode of the at least one indicator for the heat preservation state being different from each other; and
control the at least one indicator to display according to the display mode.

* * * * *